July 2, 1957    H. L. KUHLENSCHMIDT ET AL    2,797,826
REAR END LOADING PLATFORM SUPPORT FOR BRICK TRUCKS
Filed March 1, 1956                           2 Sheets-Sheet 1

Harold L. Kuhlenschmidt
Floyd E. Kuhlenschmidt
Arthur J. Geiselman
Arnold Geiselman
         INVENTORS.

BY
                        Attorneys

Harold L. Kuhlenschmidt
Floyd E. Kuhlenschmidt
Arthur J. Geiselman
Arnold Geiselman
INVENTORS.

United States Patent Office 2,797,826
Patented July 2, 1957

2,797,826

REAR END LOADING PLATFORM SUPPORT FOR BRICK TRUCKS

Harold L. Kuhlenschmidt, Floyd E. Kuhlenschmidt, Arthur J. Geiselman, and Arnold Geiselman, Elberfeld, Ind., assignors to Elberfeld Manufacturing Co., Inc., Elberfeld, Ind., a corporation of Indiana Application March 1, 1956, Serial No. 568,766

3 Claims. (Cl. 214—75)

This invention relates to improvements in trucks of the type disclosed in our Patent No. 2,746,619.

In the referenced Patent there is a truck whose bed is provided with a loading platform at the rear end thereof, the loading platform and bed having rails on which an elevator is movable with which to facilitate the loading and unloading of the truck bed. Although many materials and objects may be handled by the elevator, the primary intention is that the elevator handle construction materials, as masonry blocks. In order to reduce the length of the truck bed and loading platform when the truck is being used on the highway, the platform is made of a pair of frames which swing about approximately vertical pivots to a nested position across the back of the truck bed. When loading and unloading these frames are swung outwardly as extensions of the truck bed and the tracks on the platform align with the stationary tracks on the truck bed so that the elevator may move to a position supported on the rails throughout the length of the combined truck bed and platform. When handling heavy material or objects a considerable load is imposed on the two frames which in the main, constitute the platform. It is not desirable to have a bed or cross bracing connected to the frames that form the loading platform inasmuch as the elevator type of loader is used and the space between the frames is used as a passageway for the masonry blocks. Moreover, when a platform floor or cross bracing is used, these are additional parts which have to be supplied and which have to be handled each time that the platform is opened or closed against the back of the truck.

An object of the present invention is to facilitate the setting up of the platform at the rear of the truck bed and to support the platform very strongly and effectively by providing means in the form of legs for the frames which swing from an inoperative, approximately horizontal position on the frames to an operative, approximately vertical supporting position. By having the supporting legs for the platform frames swingable about a pivot in the manner described, they are more easily placed into operative position and therefore, the workmen are more apt to use them properly.

Another object of the invention is to provide improvements in the extension type loading platform on a motor vehicle truck bed, the improvements including means for very easily supporting the platform intermediate the front and rear ends thereof, and convenient stops for the supporting legs of the platform, the stops establishing limit of pivotal or swinging motion of the legs when the legs are in the optimum support position with respect to the platform.

These together with other objects and advantages which will become subsequently apparent reside in the details of construction and operation as more fully hereinafter described and claimed, reference being had to the accompany drawings forming a part hereof, wherein like numerals refer to like parts throughout, and in which:

Figure 1:
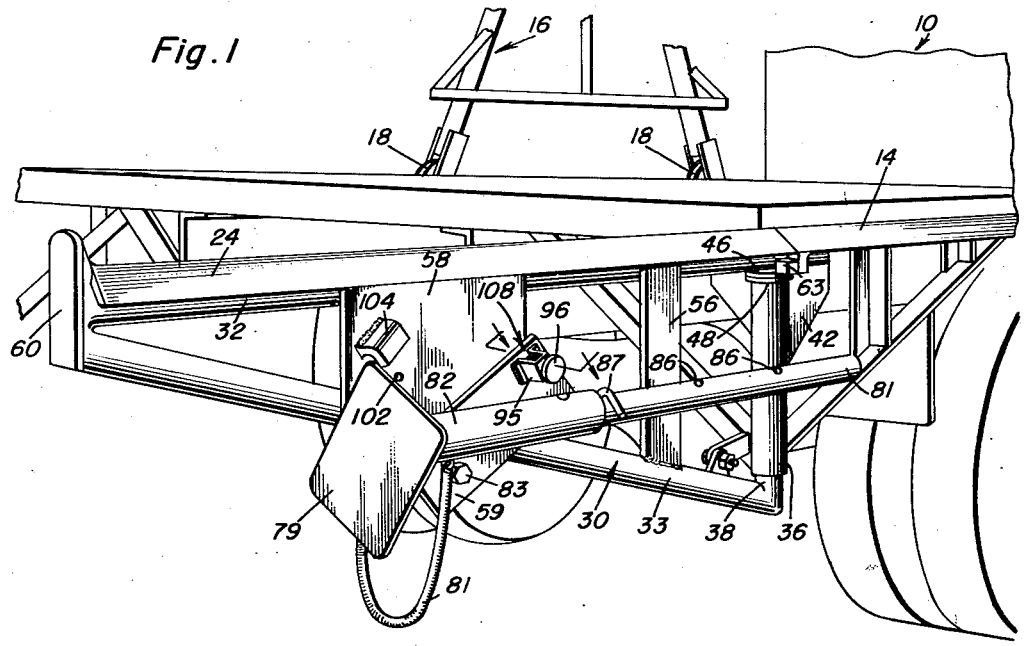
Figure 1 is a fragmentary perspective view of a typical platform at the aft end of a motor vehicle bed, showing one of the legs attached to the platform and in the inoperative position.
Figure 3:
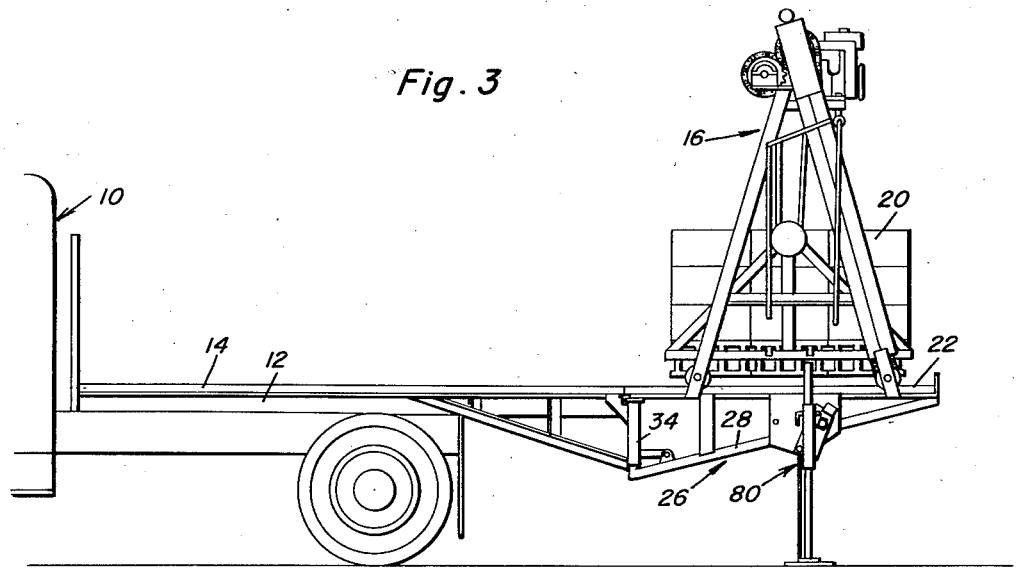
Figure 3 is an elevational view of a typical truck and typical elevator thereon, the truck and elevator being the same as the truck and elevator which is disclosed in our referred to patent.

In the accompanying drawings, particularly Figures 1 and 3 we have illustrated a typical truck 10 having among other structures, a truck bed 12 that is provided with rails 14 that are mounted on the upper surface of or along the side surface of the truck bed. A loading and unloading elevator 16 is mounted by means of rollers 18 on the rails 14 and is adapted to handle heavy or bulky objects such as the masonry blocks 20 of Figure 3. Elevator 16 may be of any type, for example one of those disclosed in our referenced patent. Its function is to slide on or roll on the rails 14 of the truck bed for the purpose of depositing or removing cargo therefrom. In this operation it also rides on the rails 22 and 24 along the top of the platform 26. This platform consists of a pair of frames 28 and 30, each being of similar construction and mounted on the truck so that its rail is alignable with a corresponding rail 14 on the truck bed.

Figure 2:
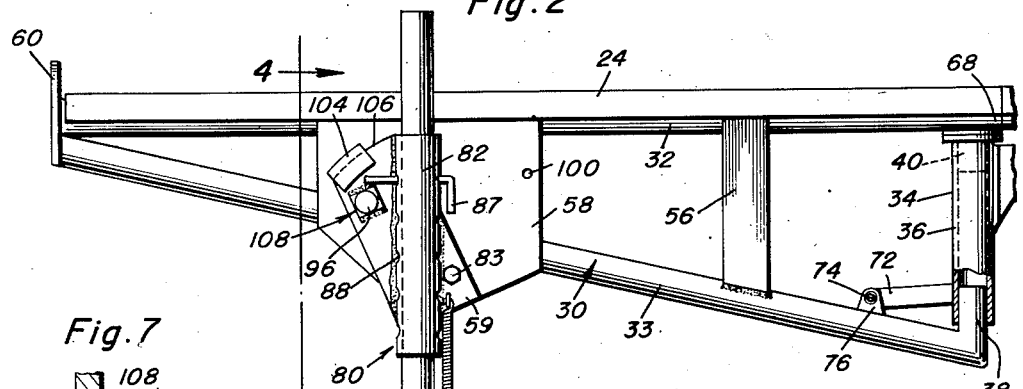
Figure 2 is an elevational view of a fragmentary part of the platform showing one of the legs of the invention applied thereto and in the supporting position for the platform.
Figures 4, 5, 6:
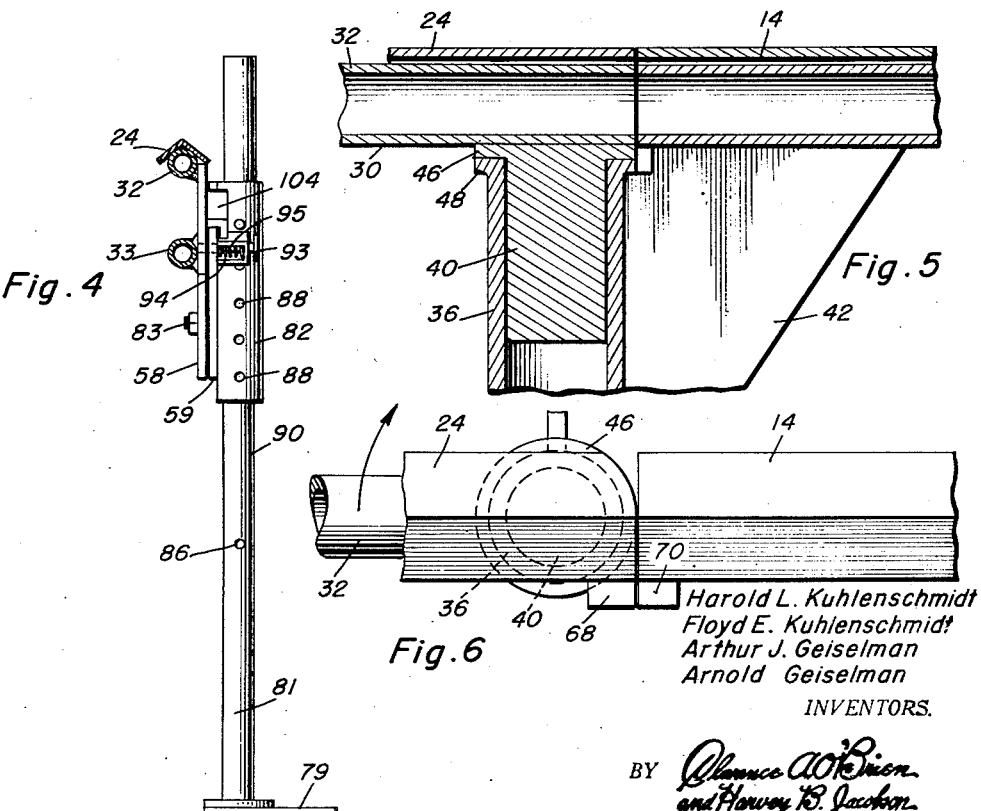
Figure 4 is a sectional view taken approximately on the line 4—4 of Figure 2 and in the direction of the arrows.
Figure 5 is an enlarged fragmentary view showing particularly the pivot connection of the frame at one side of the platform with the vehicle bed.
Figure 6 is a top plan view of the structure in Figure 5.

Frame 30 includes the upper rail 24 that seats on and is fixed to one leg 32 of the triangular framework. The other legs 34 and 36 of the framework are arranged so that the frame 30 is capable of swinging about a vertical pivot. Leg 33 represents the hypothenuse of the generally triangular framework while leg 34 is made of a sleeve 36 in which trunnions 38 and 40 are mounted for rotation. The sleeve is fixed as by being welded to gusset 42 on the truck bed. The gusset 42 is in the form of a structural supporting plate and is bolted or otherwise fixed to the truck bed. Trunnions 40 and 38 are formed respectively as angular extensions of the legs 32 and 33. They may be integrally formed or welded as shown in Figure 5. Trunnion 40 (Figure 5) is a load supporting member and therefore is preferably welded to the tubular leg 32 with a collar 46 formed at the upper end thereof. This collar rides on a flange 48 at the top end of sleeve 36 whereby a bearing for the frame 30 is formed. The lower trunnion 38 may be formed by merely bending the end of leg 33 and where a hollow stock is used, a miter welded joint may be used. Braces 56 are attached across the legs 32 and 33, while a plate 58 is also attached thereacross functioning as a support grace for the frame 30 and as a means on which to mount plate 59 for pivotal movement. A stop 60 is at the junction of legs 32 and 33, rising above the surface of rail 24 (Figure 2). By virtue of this construction the frames which form the platform when extended, are capable of being pivotally swung about the common longitudinal axis of trunnions 40 and 38 from a position flat against the back of the truck to a position parallel to the longitudinal axis of the truck bed. In this last position the rails of the loading platform are coincident with the rails 14. In addition, means are connected with the frames for limiting the swinging movement thereof in one direction.

The motion limiting means for the frames consist of laterally extending stops 68 which protrude from the framework near the pivot axis thereof (Figure 6), stops 68 being adapted to abut stops 70 that protrude laterally from the lower part of rails 14 or from a part of the truck bed. A locking device such as arm 72 on a part of the undercarriage of the truck, is adapted to be bolted as at 74 to an ear 76 on the framework leg 33. By removing the bolt 74 or merely loosening it and swinging the arm 72 from engagement therewith, frame 30 is swung inwardly toward the back of the truck. Arm 72 being pivoted at its inner end serves as a latch for engagement with bolt 74.

An extensible leg 80 is operatively connected with each of the frames. Each leg is identical in construction and consists of a rod 81 slidable in the bore of a sleeve 82. This sleeve is welded or otherwise rigidly fixed to plate 59 while the latter is pivoted on bolt 83 to plate 58. Accordingly the sleeve 82 together with its mounting plate 58 and rod 81 are capable of being swung pivotally about the axis of pin 83 from an inoperative to an operative and from an operative to an inoperative position. The operative position is that wherein the extensible leg 80 functions to support its frame while the inoperative position is when the extensible leg 80 is swung so that its foot 84 does not contact the ground or other supporting surface. This latter position will be approximately horizontal as shown in Figure 1 although it is not necessary that it be exactly horizontal. The necessity is that it be separated from the ground.

A series of bores 86 are passed transversely through the rod 81 and they are adapted to accommodate a pin 87 that is passed through a selected pair of series of openings 88 in sleeve 82. By utilizing the pin in this way the effective length of the rod 81 that is, the distance between the foot 84 fixed to the outer end of the rod and the frame 30, may be adjusted to suit the particular needs of the operator during loading and unloading of the truck.

Means are operatively connected with the extensible leg in order to prevent the parts thereof from becoming separated. The preferred means are flexible, such as spring 90 which is anchored at one end to foot 84 and anchored at the other end to a bracket on plate 58. This spring then, prevents the rod 81 from ever becoming separated from sleeve 82 unless the spring is removed or extended with a considerable force.

Figure 7:
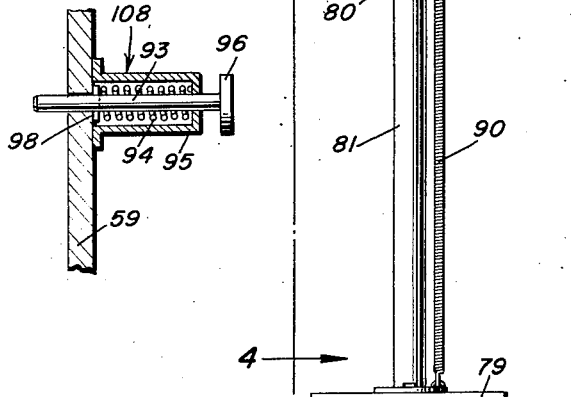
Figure 7 is an enlarged fragmentary sectional view taken on the plane of line 7—7 of Figure 1.

As indicated previously the plate 59 is capable of pivotal movement about the pin 83. This is for the purpose of swinging the entire extensible leg from the operative to the inoperative position. When in either of these positions, means are engaged for the purpose of holding the extensible leg fixed. The preferred means are seen best in Figure 7 and they consist of a pin 93 that is loaded by spring 94, the latter being captive in a housing 95 that is fixed to a surface of plate 59. The pin 93 has a head 96 on the exterior of housing 95. Spring 94 biases pin 93 so that the outer end thereof is pressed always against the surface of plate 58. There are at least two openings 100 and 102 in plate 58 in which the inner end of pin 93 is projectable. Opening 100 is arranged on the plate 58 so that the extensible leg 80 is held in the position shown in Figure 1 when pin 93 is engaged therewith. The opening 102 is so arranged on the plate 58 that when pin 93 is located therein the extensible leg 80 is approximately vertical.

For additional support and to limit the extent of travel of the extensible leg in one direction, a stop 104 is fixed to the outer surface of plate 58, this stop being in the form of a hook but having considerable width so that an edge surface 106 of plate 59 becomes nested therein at the position of pivotal motion of the extensible leg 80 that corresponds to the operative or supporting position for the frame 30 (Figure 2).

In use the truck is placed adjacent to the masonry blocks or other load. The two frames are swung outwardly and latched in position so that they form continuations of the truck bed. Then the elevator 16 is ready to be put into operation. However, to assure that the platform is rigid enough and supported enough to support the loads to which it will be subjected, the extensible leg 80 of each frame of the platform is moved to the operative position. Each leg, for example the leg shown in Figure 1, is swung to the approximately vertical position by releasing the latch 108 and manually swinging rod 81 to the vertical position. Then pin 87 is removed from its rod 81 thereby permitting the rod to drop until foot 79 comes to bear against the ground. Then the pin 87 is reinserted in aligned openings and bores in the sleeve and rod thereby fixing the extensible leg in the necessary position.

When the leg 80 is swung to the operative position (Figure 2) the limit of pivotal motion is established upon contact of the surface 106 with the stop 104. At the same or substantially the same instant of contact of these elements the latch 108 becomes engaged with its opening 102 in plate 58. This holds the extensible leg in a fixed position but in such a way that it is very easily released. To return the extensible leg 80 to the position shown in Figure 1, it is necessary only to release the latch 108 and swing the leg about its pivot 83. Upon reaching the inoperative position (Figure 1) latch 108 becomes engaged in opening 100 as described previously.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination, a loading platform for a truck bed, said platform including a pair of frames, means mounting said frames for pivotal movement between extended and returned positions, and means to support at least one of said legs while in the extended position, said support means including a rod, a sleeve in which said rod is slidable, means for locking said rod in selected positions in said sleeve to adjust the effective length of said rod, said rod locking means including a pin, a series of bores in said rod, a series of openings in said sleeve, said pin being mounted in selected pairs of bores and openings, a ground contacting foot at the lower end of said rod, means connected to said foot and said plate to prevent said rod from being separated from said sleeve, a mounting plate to which said sleeve is fixed, means pivotally connecting said plate to said frame, means for locking said plate and thereby locking said rod in selected pivoted positions, and a stop for said plate that is contacted when said sleeve and rod are in the generally vertical position.

2. A support for a platform at the edge of a truck bed, said support including a rod, means at one end of the rod for engaging the ground, means pivotally mounting said rod on the platform, said pivotal mounting means including a pivot pin, a first plate to which said pivot pin is connected, means adjustably securing said rod to said first plate, a stop contactable by said first plate to limit the pivotal movement thereof in one direction, means for locking said rod in selected positions with respect to said platform, said locking means including a spring loaded pin carried by said first plate, a second plate on said platform to which said pivot pin is attached, said second plate having at least one aperture in which said spring loaded pin is engageable to hold said first plate fastened in a predetermined position.

3. The combination of claim 1 wherein said means connected to said said foot and said plate to prevent said rod from being separated from said sleeve comprise a flexible spring and said means pivotally connecting said plate to said frame comprises a second mounting plate, a pivot connecting the first mentioned mounting plate to said second mounting plate, and said means for locking said plate and thereby locking said rod in selected pivoted positions including a spring loaded latch operative between the first mentioned mounting plate and said second mounting plate.

References Cited in the file of this patent

UNITED STATES PATENTS

| | | |
|---|---|---|
| 1,519,117 | Cochran | Dec. 16, 1924 |
| 2,605,914 | Hala | Aug. 5, 1952 |
| 2,621,812 | Lull | Dec. 16, 1952 |
| 2,685,972 | Eisenhard et al. | Aug. 10, 1954 |
| 2,701,655 | Crile | Feb. 8, 1955 |
| 2,746,619 | Kuhlenschmidt et al. | May 22, 1956 |